Feb. 23, 1965  R. P. WELLS ETAL  3,170,721
FISHING ROD SLEEVE FURRULE
Filed Jan. 18, 1962
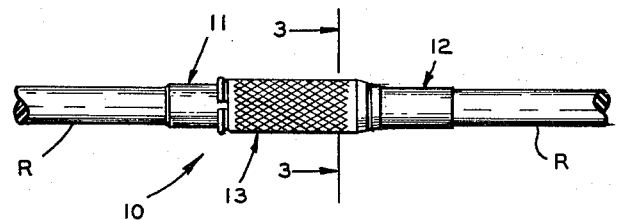
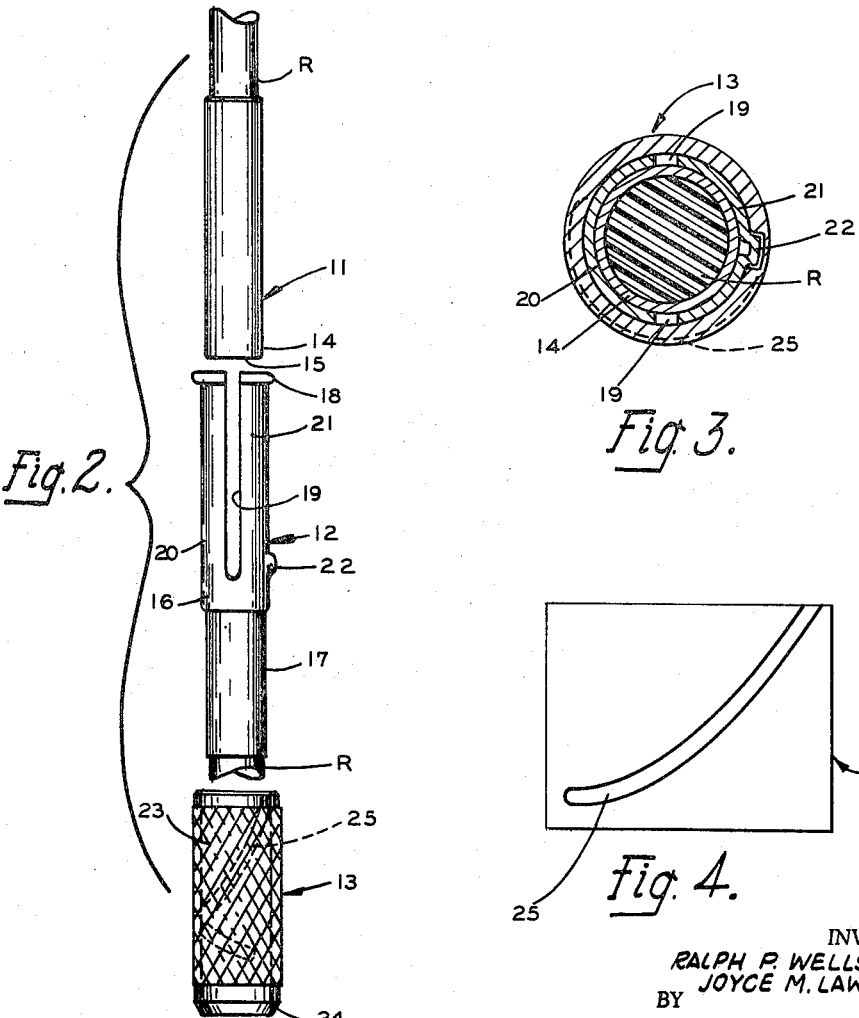
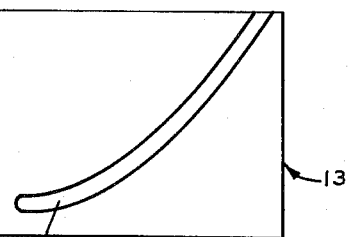
INVENTOR.
RALPH P. WELLS.
JOYCE M. LAWRENCE.
BY Ernest H. Schmidt

United States Patent Office 3,170,721
Patented Feb. 23, 1965

3,170,721
FISHING ROD SLEEVE FURRULE
Ralph P. Wells, P.O. Box 50, 274 Gratigny Station, Miami, Fla., and Joyce M. Lawrence, 4000 NW. 190th St., Opa-Locka, Fla.
Filed Jan. 18, 1962, Ser. No. 167,008
3 Claims. (Cl. 287—126)

My invention relates to fishing rods and is directed particularly to improvements in ferrules for sectional fishing rods.

Sectional fishing rods have heretofore been provided with various devices for connecting and disconnecting the rod sections, principal among which are simple friction held push-together ferrule and sleeve connectors and screw-together connectors. Such connectors or ferrules have been found to be deficient, especially in rods used in salt water fishing, because of corrosion at the juncture of the ferrule parts. If such rods are left assembled for a few days, as is often done for convenience when camping, for example, or through neglect when storing the rod upright in a convenient corner, corrosion will set in and make separation of the ferrule so difficult that the rod will often become damaged in the process.

In addition, disassembled rods of such prior construction would often corrode at the connector parts if not thoroughly cleaned, making assembly very difficult or impossible after a period of disuse.

It is accordingly an object of this invention to provide a ferrule for fishing rod sections which will disconnect and connect easily, even when corroded.

It is another object of the invention to provide a fishing rod ferrule of the character described in which the possibility of corrosion is minimized.

A more particular object is to provide a ferrule of the above nature which comprises a cylindrical male section and a split resilient female section adapted to receive the male section, a cylindrical sleeve movable over the female section for compressing the female section into frictional engagement with the male section to the same degree of friction as attained without slotting, and means constraining the sleeve to spiral movement with respect to the female section so that engagement and disengagement of the ferrule can be effected by twisting of the sleeve relative to the rod.

Yet another object is to provide a ferrule of the character described which will be simple in construction, economical to manufacture, and effective, durable and foolproof in operation.

Other objects, features and advantages of the invention will be apparent from the following description when read with reference to the accompanying drawings.

In the drawings, wherein like reference numerals denote corresponding parts throughout the several views:

FIG. 1 is a fragmentary view of a fishing rod, illustrating in side view a ferrule embodying the invention connecting the rod sections, FIG. 2 is an "exploded" view of the ferrule of FIG. 1, shown on an enlarged scale, FIG. 3 is a cross-sectional view taken along the line 3—3 of FIG. 1 in the direction of the arrows, and FIG. 4 is a developed view of the sleeve member, clearly illustrating the varying pitch of the spiral groove therein.

Referring now in detail to the drawings, 10 in FIG. 1 denotes an improved fishing rod ferrule embodying the invention, the same comprising, generally, a male section 11, a female section 12 for receiving said male section, and a sleeve 13 movable over the female section for securing the male section in frictional engagement therein.

As best illustrated in FIGS. 2 and 3, the male section 11 is tubular in form, having a body portion 14, and an outer end wall 15. The male section 11 is preferably of a corrosion and rust resistant metal, such as stainless steel or chrome-plated brass.

The female section 12, also of metal, is tubular in form and comprises a body portion 16, one end of which is formed with a relatively short reduced-diameter end portion 17 and the other end of which is outwardly rolled to form a bead 18. The juncture of the reduced diameter portion 17 with the remainder of the body portion 16 provides an internal annular shoulder serving as a seat for the outer end 15 of the male section 11, as is hereinbelow more fully described. The body portion 16 of the female section 12 is provided with diametrically opposed slots 19 extending from the outer or rolled end to about three-quarters the distance to the inner end of said body portion, thereby defining a pair of opposed arcuate wall sections 20, 21. The body portion 16 of the female section 12, near the lower end thereof and 90 angular degrees displaced from the slots 19, is formed with a circular projection 22 for the purpose hereinafter appearing.

The sleeve 13 is preferably molded of a tough, synthetic plastic material and is generally tubular in form and of such internal diameter as to fit snugly over the body portion 16 of the female section 12, as hereinbelow more fully described. The outer surface of the sleeve 13, except for short marginal end portions, is knurled as indicated at 23 for better finger grip when connecting and disconnecting rod sections when necessary, and the lower or outer end is beveled as indicated at 24. The internal surface of the sleeve 12 is provided with a spiral groove 25 of about one full turn and extending from the outer end thereof to a distance somewhat short of the inner end. As best illustrated in the developed view of FIG. 4, the spiral groove 25 decreases in pitch as it extends from the outer end to its inner terminus.

In use, one end of one of the fishing rod sections R, R will be securely fitted down into the male section 11, and one end of another rod section R will be securely fitted in the reduced diameter end portion 17 of the female section 12, the sleeve 13 being in its normal position, i.e., fully seated on said female section. When the rod sections are to be connected for use, the male section 11 will be inserted and fully seated down within the female section 12, the sleeve still being in normal position.

As hereinabove described, the internal diameter of the sleeve 13 is such as to snugly fit over the wall sections 20, 21 of the female section 12, the fit being such that said female section will act as if the ferrule were of the standard unslotted friction type. In disassembling the ferrule it is only necessary to withdraw the male section with the sleeve 13 still in place, which is the normal position for the sleeve. When it is desired to disassemble the rod section and it is found that the ferrule is corroded to such an extent that the rod cannot be disassembled by normal withdrawal without damage, the sleeve 13 will be twisted anti-clockwise so as to lower off the female section 12, whereupon, by virtue of the slight pitch of the groove 25 acting on the projection 22, said sleeve will be moved downward and off said female section with comparatively great force, thereby easily breaking any corrosion seal that may have developed. Further twisting of the outer sleeve will move it axially more rapidly, so that in a complete turn said sleeve will be fully withdrawn. The resiliency of the wall sections 20, 21 will then permit easy withdrawal of the male section 11 to completely disassemble the rod sections.

In practice it has been found that the friction grip of different individual units of the same type of ferrules heretofore devised is not at all uniform, this being so to such an extent that even without corrosion it sometimes becomes very difficult or even impossible to assemble or disassemble rod sections. The present invention also obviates this difficulty, since by retraction of the sleeve 13 the frictional resistance between the interfitting parts is reduced by about seventy-five percent, thereby allowing easy separation or assembly.

While we have illustrated and described herein only one form in which the invention may conveniently be embodied in practice, this embodiment is given by way of example only, and not in a limiting sense. The invention, in brief, is limited only by the scope and spirit of the following claims.

What we claim as new and desire to secure by Letters Patent is:

1. In a ferrule for sectional fishing rods, the combination comprising, a cylindrical male section, a tubular cylindrical female section adapted to receive said male section therein in any position of mutual rotary adjustment, the wall of said tubular female section having an axial slot, a cylindrical sleeve movable over said female section for compressing said female section into frictional engagement with said male section when received in said female section, the internal diameter of said sleeve being uniform and of such size that said compressing of said female section is only to such a degree as will permit manual insertion and withdrawal of said male section with respect to said female section when said sleeve is fully positioned over said female section, and means constraining said sleeve to spiral movement with respect to said male and female sections, said sleeve constraining means comprising an axially-extending spiral groove formed in the internal surface of said sleeve, and a projection extending outwardly of the outer surface of said female section and receivable in said groove for constraining said sleeve to spiral movement with respect to said female section, said groove being of progressively increasing pitch from one end to the other and operative to provide the least amount of axial movement per degree of angular movement when the sleeve is fully positioned on said female section.

2. In a ferrule for sectional fishing rods, the combination comprising, a cylindrical male section, a tubular cylindrical female section adapted to receive said male section therein in any position of mutual rotary adjustment, the wall of said tubular female section having an axial slot, a cylindrical sleeve movable over said female section for compressing said female section into frictional engagement with said male section when received in said female section, the internal diameter of said sleeve being uniform and of such size that said compressing of said female section is only to such a degree as will permit manual insertion and withdrawal of said male section with respect to said female section when said sleeve is fully positioned over said female section, and means constraining said sleeve to spiral movement with respect to said male and female sections, said female section being provided with a second axial slot defining, together with said first mentioned axial slot, a pair of opposed, relatively resilient wall portions in said female section, said sleeve constraining means comprising an axially extending spiral groove formed in the internal surface of said sleeve, and a projection extending outwardly of the outer surface of said female section and receivable in said groove for constraining said sleeve to spiral movement with respect to said female section, said groove being of progressively increasing pitch from one end to the other and operative to provide the least amount of axial movement per degree of angular movement when the sleeve is fully positioned in said female section.

3. In a ferrule for sectional fishing rods, the combination comprising, a cylindrical male section, a tubular cylindrical female section having a reduced diameter portion, said reduced diameter portion providing an internal annular seat, said female section being adapted to receive said male section therein in any position of mutual rotary adjustment, said female section having an opposed pair of axial slots defining a pair of opposed, relatively resilient wall portions in said female section, a cylindrical sleeve movable over said female section for compressing said female section into frictional engagement with said male section when received seated in said female section, the internal diameter of said sleeve being uniform and of such size that said compressing of said female section is only to such a degree as will permit manual insertion and withdrawal of said male section with respect to said female section when said sleeve is fully positioned over said female section, and means constraining said sleeve to spiral movement with respect to said male and female sections, said sleeve constraining means comprising an axially-extending spiral groove formed in the internal surface of said sleeve, and a projection extending outwardly of the outer surface of said female section and receivable in said groove for constraining said sleeve to spiral movement with respect to said female section, said groove being of progressively increasing pitch from one end to the other and operative to provide the least amount of axial movement per degree of angular movement when the sleeve is fully positioned on said female section.

References Cited in the file of this patent

UNITED STATES PATENTS

| | | |
|---|---|---|
| 642,193 | Baeumle | Jan. 30, 1900 |
| 1,005,153 | Case | Oct. 10, 1911 |
| 1,988,668 | Snyder | Jan. 22, 1935 |

FOREIGN PATENTS

| | | |
|---|---|---|
| 5,815 | Great Britain | Apr. 29, 1886 |
| 3,353 | Switzerland | Feb. 28, 1891 |
| 845,747 | Germany | Aug. 4, 1952 |